(12) United States Patent
Schröder

(10) Patent No.: US 6,898,312 B2
(45) Date of Patent: May 24, 2005

(54) METHOD AND DEVICE FOR THE CORRECTION OF COLORS OF PHOTOGRAPHIC IMAGES

(75) Inventor: Michael Schröder, Zürich (CH)

(73) Assignee: Imaging Solutions AG, Regensdorf (CH)

( * ) Notice: Subject to any disclaimer, the term of this patent is extended or adjusted under 35 U.S.C. 154(b) by 508 days.

(21) Appl. No.: 10/067,779

(22) Filed: Feb. 8, 2002

(65) Prior Publication Data

US 2002/0136452 A1 Sep. 26, 2002

(30) Foreign Application Priority Data

Feb. 9, 2001 (EP) ............................................. 01102803

(51) Int. Cl.$^7$ ................................................. G06K 9/00
(52) U.S. Cl. ...................... 382/167; 382/162; 358/1.9; 358/518; 345/604; 345/593
(58) Field of Search ................................ 382/162–167, 382/275, 254, 276; 358/1.9, 1.15, 525, 507, 518–521; 348/231.3, 207.1, 588; 355/77, 38; 396/18, 564, 225; 715/517; 345/604, 597, 593, 589

(56) References Cited

U.S. PATENT DOCUMENTS

| 4,566,786 A | 1/1986 | Fürsich et al. | |
| 6,466,334 B1 * | 10/2002 | Komiya et al. | 358/1.9 |
| 6,505,002 B2 * | 1/2003 | Fields | 396/287 |

OTHER PUBLICATIONS

S.N. Yendrikhovskij et al., Perceptually Optimal Color Reproduction,, IPO, Center for Research On User–System Interaction, The Netherlands, SPIE: HumanVision and Electronic Imaging, III, 1998, pp. 274–281.
Karin Töpfer et al., The Quantitative Aspects of Color Rendering For Memory Colors,, Eastman Kodak Company, Ny, 1st Pics2000 Conference, pp. 94–98, 2000.
R.W.G. Hunt et al., The Preferred Reproduction of Blue Sky, Green Grass and Caucasian Skin in Colour Photography, Kodak Limited, England, pp. 144–150, 1974.
J. Pinney et al., The Study of Colour Reproduction by Computation and Experiment, Eastman Kodak Company, NY, pp. 249–255, 1963.

(Continued)

Primary Examiner—Kanjibhai Patel
Assistant Examiner—Ali Bayat
(74) Attorney, Agent, or Firm—Burns, Doane, Swecker & Mathis, L.L.P.

(57) ABSTRACT

Color correction method for correcting the colors of photographic images represented by image data, said image data defining color values, comprising the steps of:

a) providing a set of distributions of color values in a color space, b) selecting one or more reference parts of the image to be corrected, each of said one or more reference parts having at least one color value;

c) assigning one of said set of distributions to each selected reference part of said one or more reference parts;

d) determining a transformation for transforming the at least one color value of the one or more reference parts such that the transformed at least one color value at least approximately matches the color values of the one or more assigned distributions or matches the color values of those distributions better than the at least one untransformed color value;

e) transforming the color values of the image data by means of the determined transformation to achieve a corrected image.

14 Claims, 7 Drawing Sheets

OTHER PUBLICATIONS

Mark Fairchild, Color Appearance Models, Addison–Wesley, pp. 151–157, 1998.

Keiji Uchikawa et al., Measurement of Color Constancy by Color Memory Matching, Optical Review, vol. 5, No. 1 (1998, pp. 59–63.

ICC Profile, International Color Consortium, http://www.color.org.

Addison–Wesley, Usage Guidelines for CIECAM97s, Proceedings of the IS&T's PICS Conference 2000, pp. 164–168 (1998).

Edwin H. Land et al., Lightness and Retinex Theory, Journal of the Optical Society of America, vol. 61, No. 1, pp. 1–11 (Jan. 1971).

G. Wyszecki et al., Color Science: Concepts and Methods, Quantitative Data and Formulae, Wiley, 1982.

G. Finlayson et al., White–point Preserving Color Correction, Proceedings of the 1997 Color Imaging Conference, pp. 258–261, (1997).

D. S. Sivia, Data Analysis—A Bayesian Tutorial, Clarendon Press, Oxford, 1996.

A. Jain, Fundamentals of Digital Image Processing, Prentic–Hall, International, 1989.

J. Richards, et al., Remote Sensing Digital Image analysis, Springer, 1999, $3^{rd}$ edition.

*http://www.colorblanace.com/html/memory html*, Color Memory, copyright 1998 Errol De Silva.

\* cited by examiner

Figure 6a
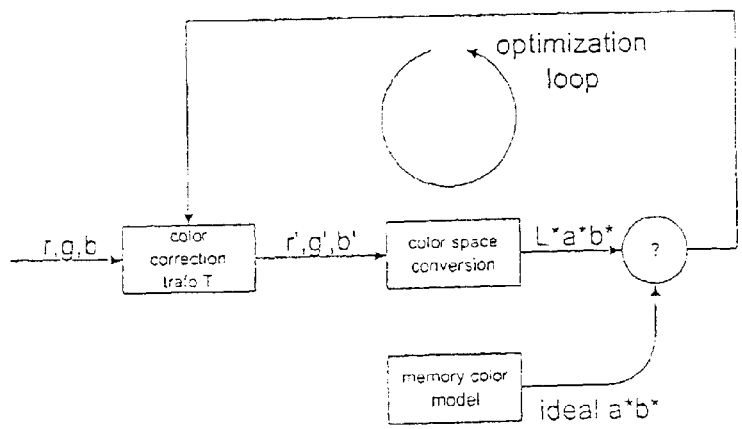
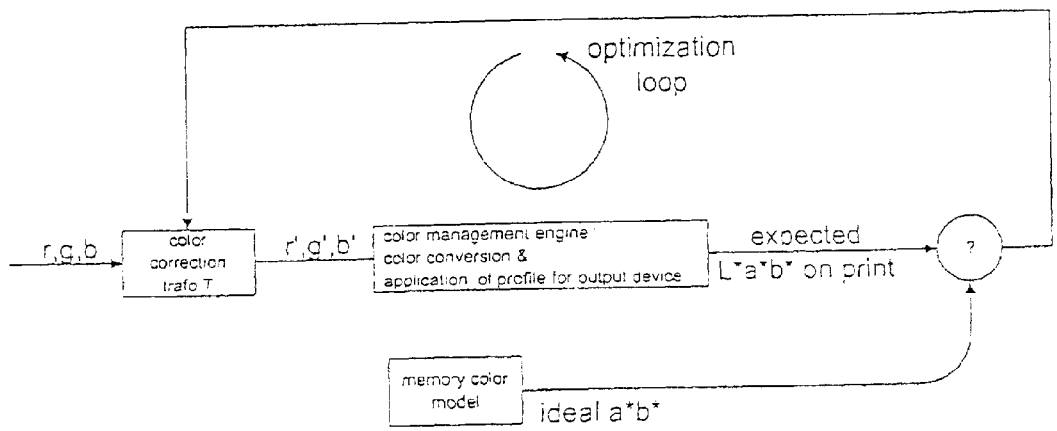
Figure 6b

METHOD AND DEVICE FOR THE CORRECTION OF COLORS OF PHOTOGRAPHIC IMAGES

BACKGROUND OF THE INVENTION

1. Field of the Invention

The present invention relates to the field of correction of colors of photographic images. The present invention relates in particular to a color correction method, to a program, which performs the color correction method, to a program storage medium on which the program is stored, to a photographic image processing device, which performs such a correction, to a photographic printer, to a photographic laboratory and to a display device for displaying photographic images (e.g. monitor and computer or only monitor, like LCD-display, CRT-display) in which such a correction method is implemented.

2. Description of the Related Art

Photographic images are recorded by means of photographic image capturing devices like cameras (still cameras, moved picture cameras, video cameras, digital cameras, film cameras, camcorders, etc.). The picture information of photographic information carried by light is captured by the cameras and recorded e.g. by means of a semiconductor chip or photochemically on a film. The analogue recorded image information is then digitalized e.g. by means of a analogue-digital converter or by scanning a film in order to achieve digital image data. The digital image data are then processed in order to transform the data in a status in which they are suitable for being displayed to a user by means of an output device (e.g. printer plus print medium or monitor).

Starting from the situation of capture of the photographic image until the final display of the image for the user or the storage of the image data for a later display, there are a lot of possible error sources, which may affect the photographic image data such that the image displayed to the user deviates from the optical appearance of the photographic object to a human being at the time the picture has been taken. The present invention relates to deviations in color.

The origins for such kind of errors or deviations may be of technical nature as well as may have their origin in the way the human being perceives colors and images. Technical causes may be, for instance, chromatic aberration of the lens system, color balance or white balance algorithms in digital cameras, spectral sensitivity of CCD chips or films, the application of color correction algorithms etc. The colors of a photographic object captured by a camera, of course, depend on the illumination spectrum. In contrary to this the human color correction system has a so-called "color constancy" feature. The human being is able to identify color samples of different color values even under different illumination conditions based on his memory about the color value (see "Measurement of Color Constancy by Color Memory Matching", Optical Review, Vol. 5, No. 1 (1998), 59–63, respectively http://www.JSST.OR.JP/OSJ-AP/OpticalReview/TOC-lists/vol05/5a059tx.htm.) The color constancy is a perceptual mechanism, which provides humans with color vision, which is relatively independent of the spectral content of the illumination of a scene. In contrary to this, the color values recorded by cameras only depend on the spectrum of the illumination light (e.g. tungsten light, flash light, sun light).

Additionally the human being has a good memory for colors of objects, which he often encounters in daily life, like the color of skin, foliage, blue sky, neutral or grey (e.g. the color of streets is grey). For instance, the skin tone is rather sensitive to slight color tone changes. For instance, in the CMYK (cyan, magenta, yellow, and black) color space the relationship for a Caucasian (European) skin tone is 13C-40M-45Y-0K. This applies at least for young women and children. Typically magenta and yellow is close to equal and cyan is about ⅓ to ⅕ below magenta and yellow. If magenta is higher than yellow, the skin tone will look red. If yellow is much higher than magenta, the skin tone will look yellow. Black should be only in shadow areas of the skin tone or on darker skin tones (see, for instance, http://www.colorbalance.com/html/memory_.html).

Since those kinds of memory colors are often present in photographic images, they represent characteristic colors for photographic images and may be used as a reference for color correction.

SUMMARY OF THE INVENTION

The object of the invention is to provide a color correction, which allows using memory colors as a reference for the correction.

According to one aspect, the present invention allows correcting the color of photographic images such that the color perceived by a human being when watching the photographic object and the subsequently memorized color is preserved or restored by means of the color correction of the present invention. Therefore the color correction of the present invention has been called by the inventor "memory color preserving color correction", which may be abbreviated as MCPCC or MCC. The MCPCC allows to calculate and perform the color correction of a digital photographic image in such a way that memory colors are reproduced in an optimal way. MCPCC is in particular applied in photographic DMD printers, photographic ink jet printers, photographic CRT printers, photographic laboratories, in particular photographic compact laboratories occupying only a small floor space (e.g. a view square meters or less than a square meter) and called "minilabs" or "microlabs". MCPCC may also be applied in the field of Central Lab Equipment (CLE), in particular for reorder stations. In reorder stations, single frames or single images are scanned or input. Those frames or images are preferably (manually/interactively) corrected by MCPCC.

Those printers or laboratories process received photographic image information. The photographic image information may be received classically on films or may be received digitally via networks (e.g. Internet, LAN, etc.) or via storage media (CDROM, disks, memory chips, etc.).

The colors used as a reference for the color correction according to the present invention are called "reference colors". Those reference colors typically correspond to memory colors and represent colors characteristic for a significant part of most photographic images. Therefore those kinds of characteristic colors (memory colors) may be derived from a plurality of photographic images, which may be selected e.g. statistically or by photographic experts. Based on this plurality of photographic images, a model for the characteristic colors (memory colors) may be derived, which describes the color values, the characteristic colors (memory colors) usually adopt. The inventor of the present invention has considered that a memory color is not represented by just one exact color value, in reality, but by a plurality of color values. According to the present invention this plurality of color values representing a particular memory color (characteristic color) may be described by means of a distribution, which describes the distribution of color values in a color space, the distribution representing one and the same memory color. A distribution describes, which color values of an image may be considered to represent a particular memory color. The distribution describes, in particular, a two or three-dimensional range or section in the color space. The distribution may not only relate to a color value, i.e. its position in color space, but may also relate to one or more parameters in addition to the color values described by the distribution. For instance, a parameter may relate to a probability that a color value represents a particular memory color. This probability may, for instance, be deduced from the statistical abundance of the color value in a plurality of photographic images. In this preferred case, the distribution represents a probability distribution. According to another example, a parameter may represent a weighting factor for the correction procedure, i.e. a measure for the importance of the color value for the representation of a memory color. Usually the color values are the more important the higher the abundance or the higher the probability is. Additional criteria may be considered to evaluate the importance of a color tone, e.g. its location in the image (center or margin).

According to another aspect of the invention, not only one but several different distributions may be provided for one and the same memory color in case additional information about the image capture situation is available. If, for instance, the digital camera stores that the image has been taken under flash light conditions, a distribution adapted to flash light conditions or based on a plurality of flash light photographic images may be used instead of a standard distribution, which covers all kinds of image capture situations (sunlight, flash light, in-house). However, preferably, this kind of additional information is preferably used to determine the so-called prior knowledge as described below and thus, if no additional information is available, preferably only one distribution is assigned to one and the same memory color. According to the present invention the memory color is used as a reference color. Preferably a set of reference colors and thus their corresponding distributions is provided. The predetermined data on the distributions may be stored in a memory unit and/or may be accessed via network on demand and may be updated e.g. based on new statistical data.

The color correction method or the color correction device of the present invention receives the image data, which are to be corrected, and which represent a photographic image. The image data are preferably received in digital form, e.g. via a storage medium or via network. Alternatively or additionally, the color correction device of the present invention may comprise a scanner, which scans a photographic film in order to produce the digital photographic image data.

According to the present invention, one or more reference parts of the image represented by the image data are selected. A reference part of the image usually represents a spatial section of the image. A reference part of the image may be a pixel or a number or plurality of pixels, where preferably each pixel is at least a neighbour to one other pixel of the reference part. A color value is assigned to each pixel, which has a particular position in the image. Since the reference part consists of at least one pixel, the part has at least one color value. If the reference part consists of a plurality of pixels, there may be a plurality of color values in the reference part. The "reference part" is also referred to simply as "part" in the following.

The selection of a reference part of the image is preferably performed such that the part is related to a reference color, usually at least most of the color values and the part are similar or even equal. The color values are usually digitalized and may, for instance, be represented by a three-dimensional vector, the components of which has integral numbers (e.g. 0 . . . 255). Different color spaces may be used to describe the color values, e.g. RGB, sRGB, CMYK, Lab, CIELab, etc.).

According to an aspect of the invention a reference color and/or the corresponding distribution (or selected distribution) is assigned to the part. The assigned distribution is selected out of the set of available distributions.

Based on the distributions assigned to the selected parts or, in other words, based on the reference colors (memory colors) assigned to the selected parts of the image, a transformation is determined. The transformation represents a manipulation of the image data for correction purposes. The transformation is determined based on the color value or color values present in the one or more selected parts. These color values represent the starting point for the transformation. The distributions define the end point for the transformation to be determined. The aim is that the color values of the selected parts match the color values described by the distributions after the transformation has been performed. If there is more than one part and more than one distribution, the transformation preferably achieves that the transformed color values of each part match the color values of the distribution assigned to the respective parts. The determination is performed such that the matching is optimized or at least such that the transformed color values match the color values of the distribution better than the untransformed color values. Preferably the optimization is performed using a forward model, i.e. the transformation is changed until the color values modified by the transformation optimally match the distributions of the colors, which preferably represent models of ideal memory colors.

Based on the determined transformation, the color values of the image data, preferably of all image data may be transformed in order to achieve a corrected image. The idea behind this step is that not only the selected parts are transformed in order to achieve a corrected image but also the remaining (unselected) parts of the image are corrected in the same or corresponding way as the selected parts are corrected. In this way the distributions, which represent reference colors, are used to correct the whole image by referring to those parts of the image, which should represent a particular reference color (memory color). The basis for this correction are the distributions (or is at least one distribution), which represent knowledge about typical memory colors in photographic images. Since the memory colors are not represented by exact color values (a single point in color space) but by distributions, an "unsharpness" is introduced in the color correction principle of the present invention. This "unsharpness" allows for an optimization procedure, which allows a flexible and smooth adoption of the correction even to a plurality of selected parts and memory colors.

The above-mentioned "matching" may be considered to be achieved, if the transformed color values of the reference part(s) are close to that subspace or section of the color space which is occupied by the assigned distribution, if the transformed color values are closer to that subspace or section than the untransformed color values, if at least part of the transformed color values are within that subspace or section of the color space or if most or all transformed color values are within that subspace or section of the color space. The "degree of matching" may be measured in terms of degree of overlap or closeness relative to the closeness of the untransformed color values. A more preferred attempt is based on probability considerations, which allows the evaluation of a matching degree, based on which an optimization procedure may be performed. This preferred attempt based on probability considerations will be described in more detail later.

Preferably the color correction or the color correction method of the present invention is performed incrementally or iteratively. For this purpose, the selection of one or more parts, the assignments of distributions to the selected parts, the determination of the transformation and the transforming of the image data (and in particular the displaying of the transformed image data) is performed repeatedly. That is, in a second repetition cycle, again one or more parts are selected which preferably differ from the previous selected parts, again (one or more) distributions are (respectively) assigned to (one or more) parts, again the transformation is determined based on the newly selected parts and newly assigned distributions and preferably additionally based on the previously selected parts and assigned distributions, and, according to one embodiment, again the color values of the already corrected image data are corrected based on the again determined transformation. According to another, preferred embodiment, again the color values of the original, not-corrected image data are corrected based on the again determined transformation.

Preferably, probabilistic models are used for the memory colors, i.e. the distributions of the color values are defined via a probability. Preferably, the probability is a conditional probability, which defines the probability of a color value under the condition of a particular memory color (reference color). The model of each memory color, i.e. the probability distribution for each memory color may be derived from a set of training data provided e.g. by photographic experts, which analyse a plurality of photographic images (in order to find examples for memory colors) by an automatic or analysis of a plurality of photographic images. The training data are preferably statistically analysed. A function (e.g. Gaussian function) or LUT is preferably derived from the statistical analysis. Additionally, the probability distributions may be used to evaluate the quality of matching between the transformed color values and the color values defined by the distributions. This quality of matching may be called "matching degree". For instance, it may be assumed that the degree of matching is the better the higher the probability is that a transformed color value represents a memory color. The probability may be calculated based on the probability distribution.

Generally speaking, an optimization process according to the present invention is preferably based on the evaluation of a degree of matching between the transformed color values and the color values of the assigned distributions. This matching degree may be calculated in the case of probability distributions as mentioned above. If the distributions simply define sections in color space, for instance the degree of overlaps between the sections in color space defined by the color values of the reference parts and the section of color space defined by the distributions may be used as a matching degree for the optimization process. The optimization process is performed such that the "matching degree" is as high as possible. If there are more than one part of image and/or more than one distribution, the "total matching degree", which describes the overall matching quality for all parts and the assigned memory colors, is preferably evaluated based on a number of single matching degrees. The single matching degrees respectively describe the matching between color values of one part and the color values of the distribution assigned to that one part. Preferably the total matching degree is a function of a number of single matching degrees. Preferably the function mathematically combines the single matching degrees.

In the case of a probability distribution, preferably conditional probabilities for each part are calculated. These conditional probabilities represent the probability that the image color values of a part belong to the memory color assigned to that part and thus respectively represent a single matching degree. Preferably, the total matching degree is a function of the single matching degrees. Preferably, the function corresponds to a product of conditional probabilities related to the selected parts.

If the distributions are probability distributions, the "matching degree" is based on the probability and is therefore called in the following "matching probability". The matching probability describes the probability that a transformed color value belongs to the distribution or reference color assigned to that part of the image in which the color value is present.

The matching probability is preferably determined based on the distributions, which define a probability of color values to represent a reference color. Alternatively or additionally the matching probability is based on information about a (systematic) influence on the color values of the image data. This influence may have happened starting from the time of capturing the photographic image (e.g. spectrum of illumination of the photographed object, e.g. flash light) until the reception of the image data by the color correction method or color correction device of the present invention. This information on systematic influence is also called "prior knowledge" and will be discussed later in more detail.

Preferably a probabilistic, in particular a Bayes inference method is used to determine the transform.

Preferably a user interface like a monitor, keyboard, microphone, touch screen and/or mouse is used in order to select the above-mentioned parts of the image, which are deemed to represent a reference color. Preferably the user selects the part e.g. by designating parts of the image displayed on a monitor by means of a mouse. Alternatively or additionally, the user may select by means of a user interface the reference color for a selected part. For instance, for this purpose a set of reference colors may be displayed on a monitor for the selection procedure.

According to another aspect of the invention, instead of manual selection by means of a user, an automatic selection may be performed. This automatic selection may be based on an algorithm. This algorithm may analyze the color values and/or their spatial distribution in the image in order to detect regions related to reference colors. Pattern detection mechanisms or algorithms are preferably employed to detect those regions. The detected regions may then automatically be selected as the above-mentioned parts of the image or may be displayed as candidates for reference parts. The user may then select one of those candidate parts. Preferably the algorithm assigns a reference color to the selected parts. Alternatively candidate reference colors are displayed on a monitor and a user selects then a reference color out of the displayed candidate colors.

Preferably, a selection and assignment automatism uses independent information for a first process, i.e. the selection of parts of the image and for the assignment of distributions or corresponding reference colors to those parts, and for a second process, i.e. for the color correction. For instance, for the first process, the automatism or algorithm preferably uses spatial information included in the image data, for instance, textual information, structure information or patterns. The analyzation may be based on luminance information (grey levels), contrast information or gradient of luminance information. Additionally pattern recognition algorithms may be applied to identify particular spatial structures of the image. Preferably information is provided, which relates identified patterns to reference colors or memory colors. For instance, a lookup table may be provided in order to perform this task. If, for instance, the algorithm identifies in the image the pattern of a face of a human being, then a reference color, which corresponds to the color of skin, may be assigned to the corresponding part of the image. Additionally or alternatively to faces, of course, other objects may be detected and selected as reference parts, e.g. streets, the reference color thereof will be grey. Preferably, the first process (selection of part and assignment of reference color) has been performed without referring to information on color hue or color saturation included in the image information.

Preferably, the second process (the color correction) is performed solely based on information on color saturation and color hue. If, for instance, the color values are represented as Lab vectors, the correction may be based solely on the a and b values of the vector. A major advantage of this kind of automatic selection, assignment and correction is that even images having a significant color distortion may be corrected reliably since the selection of the parts and the assignment of the distributions (or corresponding reference colors) has been performed independent from information on color hue and color saturation.

If it is already known that the corrected image data will be passed to a particular output channel (e.g. a printer or minilab) and if the color management profile (such as an ICC profile; International Color Consortium, http://www.color.org) is known, then this knowledge can be used during the step of determining the transformation, in particular during the corresponding optimization process. For this purpose the determination of the transformation is performed such that the transformation comprises a color management transformation, which corresponds to the color management profile of the output channel.

Additionally or alternatively, the correction may be performed in view of the human color perception of the image. For this purpose a color appearance model (such as CIECAM97s, Mark Fairchild, "Color Appearance Models", Addison-Wesley, 1998; N. Moroney, "Usage guidelines for CIECAM97s", Proceedings of the IS&T's PICS Conference 2000, p. 164–168, 2000 may be used. The color appearance model may be represented by a transformation, i.e. a color appearance transformation. The transformation used for correction according to the present application is then determined such that the transformation comprises such a color appearance transformation.

The present invention is not only directed to a method but according to a further aspect of the invention also to a program and a computer storage medium comprising the program. Additionally, the present invention according to another aspect is directed to a photographic image processing device, which performs the above-described correction processes. Such a photographic image processing device preferably comprises a memory unit which stores the distributions, an input unit which receives the digital image data, a selecting unit which selects the reference parts, an assignment unit which assigns the distributions to the reference parts, a determining unit which determines the transformation by considering the above discussed matching, and a transforming unit which performs the correction transformation. Such a photographic image processing device may be implemented by ASICs, hardwired electronic components and/or computers or chips programmed in accordance with the method. Furthermore the invention relates to a photographic printer or photographic laboratory, in particular a photographic minilab, which performs the method described above, which comprises the above described photographic image processing device. Each device may comprise a data processing device, e.g. a computer, on which the above-mentioned program runs or is loaded.

BRIEF DESCRIPTION OF THE DRAWINGS

FIG. 6a shows an optimization via forward modelling, in accordance with a basic embodiment of the present invention;

FIG. 6b shows an optimization via forward modelling, where the basic embodiment is combined with color management for a known output channel;

DETAILED DESCRIPTION OF THE PREFERRED EMBODIMENTS

Further features and advantages of the present invention are disclosed in the following detailed description of embodiments. Different features of different embodiments may be combined.

According to one preferred embodiment of the present invention a color correction method or device is provided which allows a user to interactively perform color corrections of digital images. The application is best being done incrementally, i.e. the user provides his first example for a memory color in a part of the image. Based on this example, the color correction is optimized and then displayed. The user may then inspect the displayed image and can then select additional parts or may quit the correction process, i.e. he may accept or reject the correction.

A main benefit of the MCPCC described herein is that even novice users (e.g. customers) of a minilab or customers in a retail photo shop (in which the minilab or color correction device is implemented) are enabled to perform professional color correction in a short time. Preferably the definition of memory colors (reference colors) is performed with respect to a standardized color space. Since the color correction is done relative to the definitions of the memory colors combined with the user input points and preferably not relative to the colors on the display, the color correction even works in combination with a non-calibrated display. Furthermore the color correction may be combined with color management and/or color appearance models as mentioned above and as will be described in more detail below.

Figure 1:
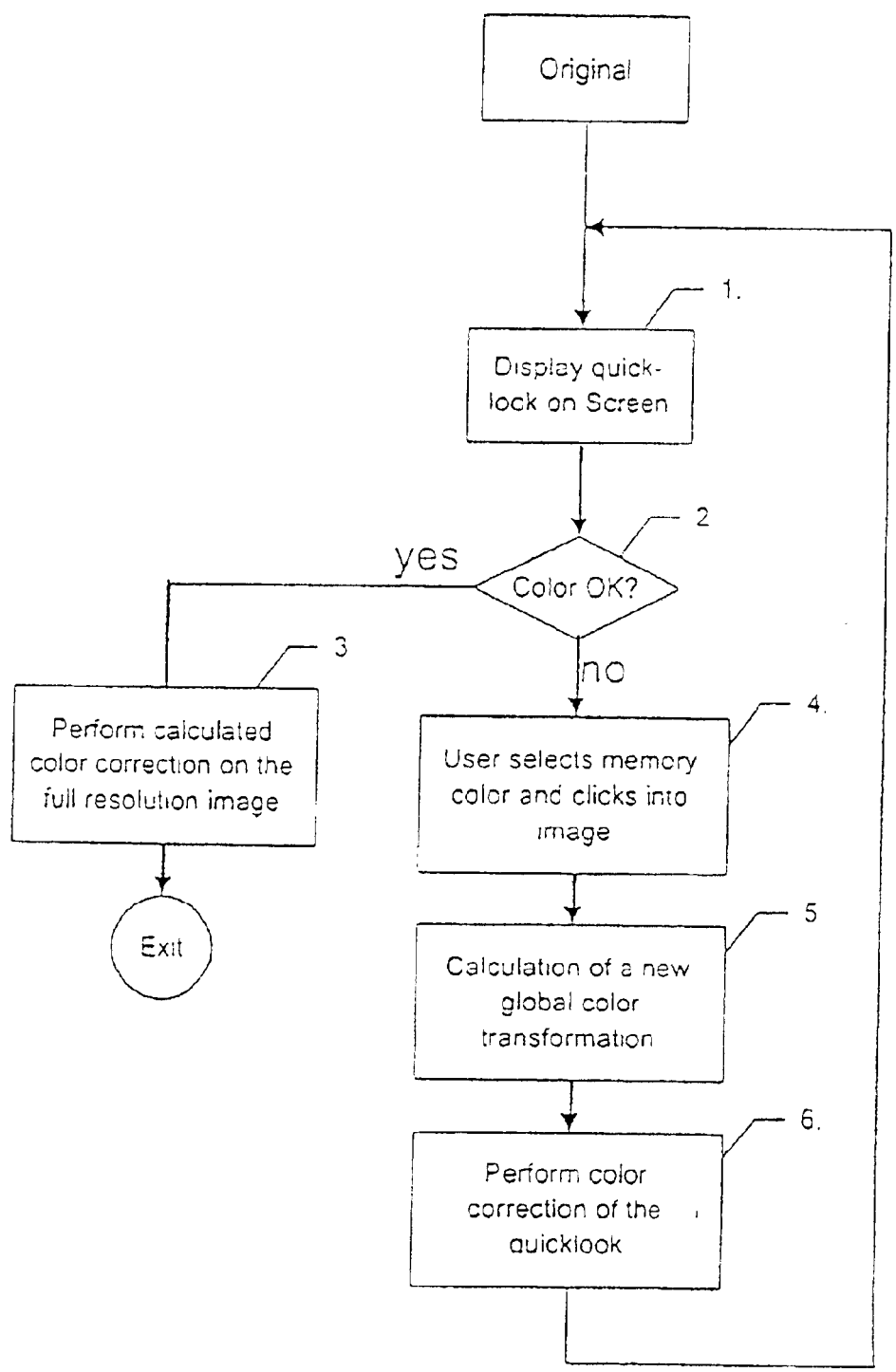
FIG. 1 shows a basic MCPCC workflow.

FIG. 1 shows the basic workflow of MCPCC in accordance with one embodiment of the present invention. The image to be processed is first displayed as a "quick look" of smaller size to the user. A "quick look" is a version of the image of smaller size, that is, with fewer pixel but the same content. For instance, the quick look may be achieved by downsampling the image data.

After the first step of displaying the quick look on a screen, the user may decide in a second step whether an additional color correction is necessary or not. If this additional color correction is deemed to be not necessary, the full resolution image is processed in a third step and the processed image data are output for further processing (or stored to a file). If the user decides that an additional color correction is necessary, i.e. if the color is not ok, the user selects in a fourth step a memory color for a part of the image. For instance, the user provides a point in the image as an example for a realization of a particular memory color in the image. The information resulting from step 4, i.e. a reference part, color values in that reference part of the image, and a memory color assigned to that reference part of the image, is added to the existing data as additional information and a new global color transformation is calculated. The global color transformation represents a transformation, which may be applied to all pixels of an image. Based on the calculated global color transformation, the color values of the quick look are corrected or the already corrected color values are again corrected (updated correction). After this step 6, the new quick look is displayed in step 1. Thus the workflow shown in FIG. 1 starts all over again.

During the interaction of the user with the correction device (e.g. a minilab or a printer), the act of providing a relevance part (step 4) is most important. During this step, the user indicates that a certain part (area) of the image is of certain content with a characteristic color (reference color, memory color). Therefore this part is herein also called "reference part". The way in which the user communicates this (the location of the part and its shape and the kind of memory color) can be accomplished, for instance, in two slightly different ways.

Figure 2:
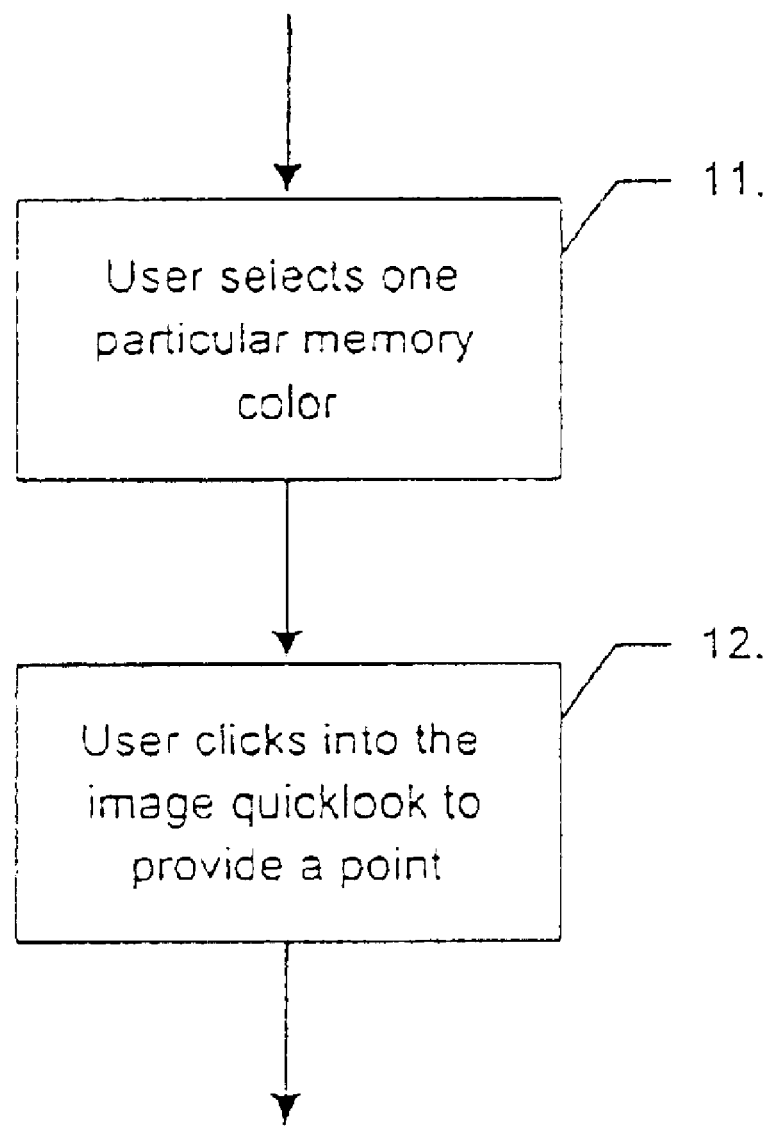
FIG. 2 shows a realization of step 4 in FIG. 1.

The simpler way of these two ways is depicted in FIG. 2, which represents a realization of step 4 of FIG. 1. First the user selects one particular memory color, e.g. by clicking on an appropriate button/icon on the monitor (step 11). For instance, a plurality of different colors representing memory colors (reference colors) may be shown on the monitor and the user may select a particular color of the shown set of colors by clicking on the color. Preferably a distribution of color values is assigned to each of the shown colors. In a next step (step 12) the user clicks into the area of the image that is of the previously selected content, i.e. that should show the previously selected memory color after correction. Of course, the steps 11 and 12 can be changed, i.e. the user first selects the relevant part and then selects the reference color (and thus the corresponding distribution) for the selected reference part.

Figure 3:
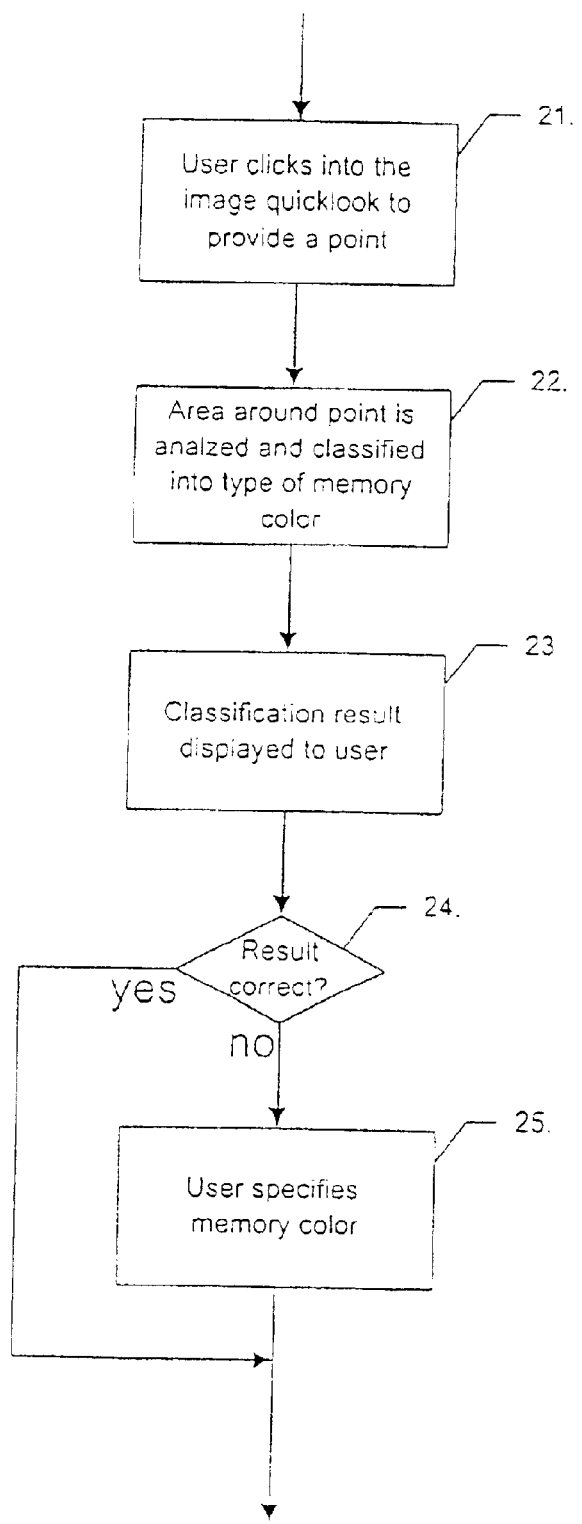
FIG. 3 shows a semi-automatic realization of step 4 in FIG. 1.

The other more complicated way of the above-mentioned two different ways for realizing step 4 in FIG. 1 is shown in FIG. 3. The advantage of this solution is that the assignment procedure, which assigns a reference color to the reference part, is more automatic. The steps 21 to 25 replace the step 4 in FIG. 1. At the beginning (step 21), the user clicks into the image for selecting a memory part without first selecting a particular memory color. Then (step 22) the image data at the click position, i.e. the image data in the reference part identified by the clicking, is analyzed and classified into the most probable memory color. In order to make this classification more robust, an automatic color correction (such as "grey world" or "white patch") can be used. The purpose of the automatic color correction is to make the identification of reference parts more robust by reducing color distortions. Examples for automatic color correction algorithms are given in Fursich, M., U.S. Pat. No. 4,566,786 (1986) and E. Land and J. McLann, Journal of the Optical Society of America, 61, 1, p. 1 to 11, "Lightness of Retinex Theory". In case of the "grey world" method, it is assumed for correction that the image should be grey in the average. In case of the "white patch" method, it is assumed for correction that the maximum value should be present in each color channel (e.g. r, g or b) at least once in the image.

If there is for instance a tungsten color distortion, as one often encounters for in-house pictures, the image is often orange. Grey parts of the image have an orange color cast and are therefore close to skin color tone. An automatic classification in memory color categories might therefore result in an output of "skin" color instead of "grey" ("neutral"). The above-mentioned automatic color correction algorithm represent a precorrection which is applied to make the identification of reference parts or reference colors by MCPCC more robust.

The classification result is communicated to the user in a next step. If there is more than one probable result for a memory color, all probable candidates for a memory color may be displayed to the user, for instance, in a sequence, which corresponds to their probability, and the user may then select one of the shown candidates. However, in the embodiment shown in FIG. 3, only one classification result is displayed to the user in step 23. The user is then asked in step 24 whether this result is correct. If the result is correct (yes), the workflow of FIG. 3 ends. If the result is not correct, the user manually selects the correct one.

In the following the correction method, in particular the determination of the transform is described in more detail. The method is described by referring to mathematical expressions and terms. In particular the method is described as an algorithm.

As input data to the method, a digital image (e.g. from a digital camera or a scanner) and a certain number of reference parts i (i=1 . . . N) in the image with annotated memory colors $A_i$ are used. The reference parts may be identified by the position, e.g. by Cartesian co-ordinates $x_i/y_i$. The reference parts may comprise one or more pixels (picture elements or image elements). The number of relevance parts given is N. The image data at the position of each relevance part is characterized by a characteristic color value. If the relevance part consists of more than one pixel, the color value assigned to the relevance part may be a function of the color values of the pixels in the relevance part. The function may, for instance, be the arithmetic medium or the median of the color values of the pixels or the color values in the center of the relevance part may be more weighted than the color values of the pixels in the periphery of the reference part. The color value of the reference part (e.g. the function of the color values of the pixels in the reference part) may be described in a particular color space, e.g. RGB. In the latter case, the color value of the reference part i has the values $r_i, g_i, b_i$.

If pointing on the image identifies the reference part, the reference part may just correspond to the pixel at that point. Alternatively, the reference part may correspond to mean values of a region around the point, whereby the region may be a region of fixed size centred at the point, a region obtained via region growing, which is obtained by starting at a user point and by then growing the region until some criterion is met (the criterion may be the number of pixels used for a region or a threshold value for a color value distance from the color value of the starting point), or a region provided by the user. The user may also encircle that part of the image (e.g. by means of a mouse). The encircled part is then identified as the reference part.

After the input data, i.e. the reference part, the actual color value of the reference part, and the reference color, which corresponds to the target color value of the reference part, is available, the transformation T for the color correction may be determined. At the beginning the transformation T is unknown but may be defined as:

$$\begin{pmatrix} r' \\ g' \\ b' \end{pmatrix} = T \begin{pmatrix} r \\ g \\ b \end{pmatrix} \quad (1)$$

The above given representation of the color values as rgb values is only an example and other representation of the color value, e.g. by means of Lab vectors, may be chosen. The transformation T transforms the rgb values into the new pixel values r'g'b'. For the application for MCPCC, this transformation can be as complicated as is necessary. Examples for transformations are disclosed in G. Wyszecki and W. Stiles, Color Science: "Concepts and Methods, Quantitative Data and Formulae", Wiley, 1982. For instance, the transformation may be as follows:

- The rgb values are simply scaled. This kind of correction is often done in digital cameras. In this case, the transformation T corresponds to a diagonal matrix in which the components of the matrix correspond to multiplication factors.
- The color values may be transformed from one color space into another color space by the transformation. For instance, the rgb values may be transformed to colorimetric XYZ values and then these values are scaled. Preferably, the color values of the reference parts are transformed into a color space in which one dimension represents the luminance or lightness and the other dimensions, independent therefrom, describe the color hue and the color tone.
- The transformation may transform rgb values or any other kind of color values into LMS Cone response values and then these values are scaled.
- The transformation may represent the application of a general 3×3 matrix in any of the above-mentioned color spaces. The matrix may represent a rotation, deformation, or displacement in color space. In particular, if one of the dimensions of the color space represents luminance or brightness, the transformation may be constructed such that the luminance value is kept constant. For instance, the transformation may comprise a matrix, which describes a rotation around the luminance or brightness axis.

A determination of T may be based on the differences between vectors which represent the untransformed color values in the reference parts and the color values of the distribution assigned to the reference part. Given some simplifying assumptions, a straight forward calculation of T may be performed as described in the following:

a) The transformation T is linear (e.g. diagonal 3×3 matrix).
b) The cost function is calculated in a color space which results linearly from rgb (e.g. XYZ color space).
c) The cost term per reference part is quadratic (corresponding to a simplified Gaussian probability model).

If the above assumptions a), b) and c) are given, the transformation T may be calculated based on a system of overdetermined linear equations. Those equations may be solved directly by means of a pseudo inverse (see e.g. G. Finlayson and M. Drew, White-point preserving color correction, Proceedings of the 1997 Color Imaging Conference, p. 258–261, 1997).

In the following a model for memory colors is described, which concerns to distributions of color values corresponding to the memory colors. This model is a probabilistic model. Each memory color $A_k$ ($A_1$=neutral, $A_2$=blue sky, $A_3$=skin, $A_4$=foliage) is defined via its likelihood:

$$p(a,b|A_k). \quad (2)$$

The above term expresses the probability that a realization of the memory color $A_k$ is of color a, b. Only as an example, it is assumed in the following that the parameters a and b correspond to the components a and b of the Lab vector. It is also possible that there is only one parameter or that there are more then two parameters which may correspond to the color value, color hue or may correspond to XYZ color values. An advantage of the a and b values of the Lab vector is that a representation of the probability by means of Gaussian functions may be achieved. The above expression represents a conditional probability and describes the probability of a color value a, b under the condition of a memory color $A_k$.

Figure 4:
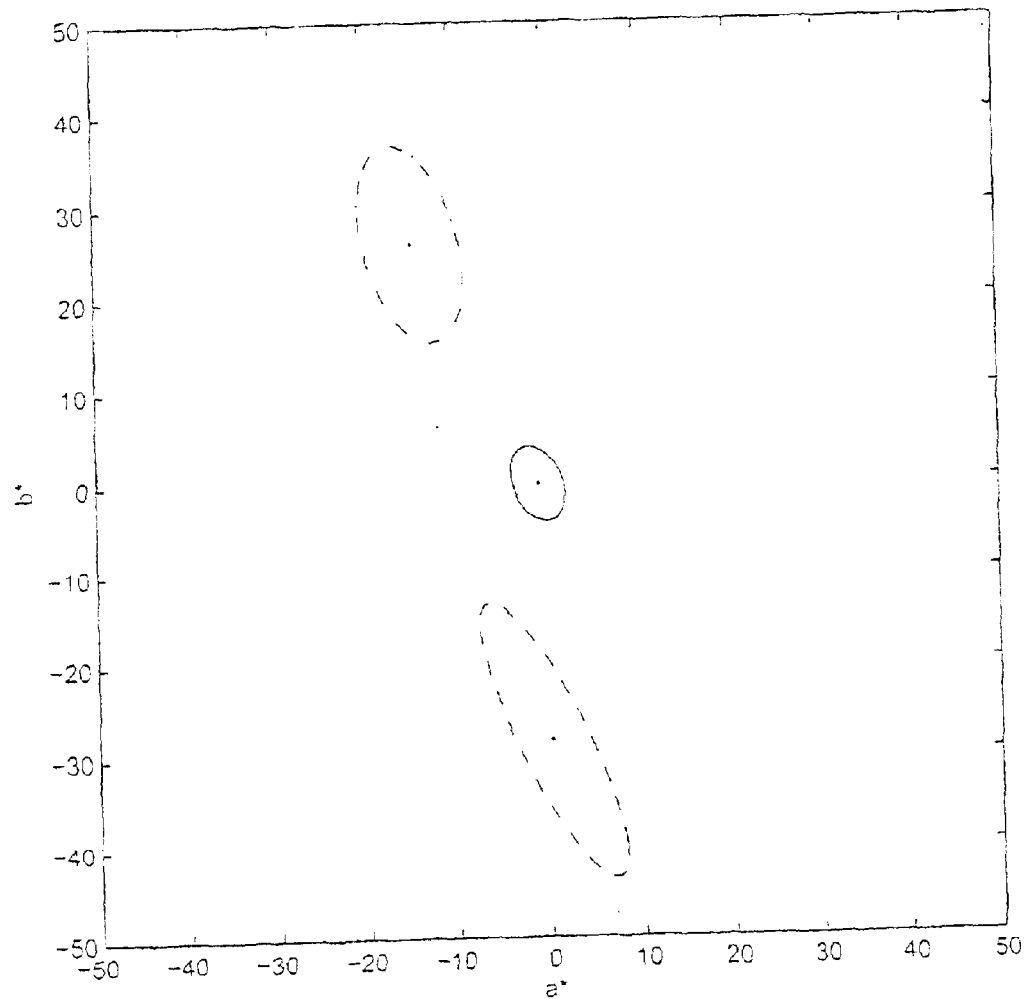
FIG. 4 shows memory color models for "neutral" (full line), "blue sky" (dashed), "skin" (dotted), and "foliage" (dash-dotted)

The detailed shape of the above equation (2) can be as complicated as necessary to describe the training data, e.g. to describe the result of a statistical analysis of memory colors in a plurality of photographic images. The inventors have achieved satisfying results, when they describe the probability distributions with two-dimensional, multivariate Gaussians. The FIG. 4 depicts examples for memory color models (probability distributions) of "neutral" (full line), "blue sky" (dashed), "skin" (dotted), and "foliage" (dash-dotted). The probability distributions are shown such that the Gaussians are depicted at 50% maximum probability of each memory color. The corresponding (a, b) color value lies on the full line in FIG. 4. The integral of $p(a, b|A_k)$ over all possible color values a and b is 1.

The probability function $p(a, b|A_k)$ is preferably chosen such that there is a constant section or region near by or around the maximum. For instance, the top of the Gaussian function is preferably flattened. For instance, the constant section covers a certain part of the amount of data, for instance five to twenty percent, preferably about ten percent. In this way, an "overcorrection" of the data may be prevented. Instead of a constant section, a section may be chosen which has a flat gradient towards the maximum. Preferably the gradient is below a predetermined value which is below the value which is achieved by fitting the training data, in particular below the gradient which is defined by the Gaussian function near by the maximum.

If the color values of a reference part are within the constant or flattened section, then a correction is preferably not performed, i. e. a transformation has not to be determined.

The memory colors are discussed in literature. Examples are as follows:

K. Toepfer and R. Cookingham. The quantitative aspects of color rendering for memory colors. In IST PICS2000 Conference, pages 94–98, 2000. location: MS.

This document pertains to foliage, blue sky, skin tone as memory color and pertains to image quality.

Mark Fairchild. Color Appearance Models. Addison-Wesley, 1998. location: IIT.

This document, in particular p. 154 pertains to the description of experiments on memory color and other context and structural effects.

R. Hunt, I. Pitt, and L. Winter. The preferred reproduction of blue sky, green grass and Caucasian skin in colour photography. J. Photogr. Science, 22:144, 1974.

This document pertains to a study of image quality in reflection prints. Preferred blue sky was found to have a higher purity then average real blue sky. But preferred green grass and Caucasian skin had similar purities but were slightly yellower than average real samples.

J. Pinney and L. DeMarsh. The study of colour reproduction by computation and experiment. J. Photogr. Science, 11:249–255, 1963.

This document pertains to the determination of preferred reproduction of flash color and sky.

S. N. Yendrikhovskij, F. J. J. Blommaert, and H. de Ridder. Perceptually optimal color reproduction. In SPIE: Human Vision and Electronic Imaging III, 1998, pages 274–281, 1998.

This document pertains to the memory colors of a skin, grass and sky and to psychological studies.

In the following, it is described in which way the transformation is determined in order to achieve the best matching between the transformed color values of the reference parts and the color values of the probability distributions of the reference colors assigned to the reference parts. The method described in the following is an optimization method or algorithm.

The transformation T is characterized by a certain number of parameters (e.g. the scaling factors rf, gf, bf) representing e.g. the diagonal components of a 3×3 matrix. These parameters are determined from the input color values $r_i$, $g_i$, $b_i$ of the selected parts i in such a way that the transformed pixels $r'_1$, $g'_1$, $b'_i$ correspond to the optimal realization of the corresponding memory color $A_1$ as good as is possible given the reference parts and the color values of the reference parts.

The degree of "as good as" may be defined in the a–b color plane of the Lab color space. The components of the Lab color space may also be designated as L*, a*, b* (see, for instance, FIG. 4). In this case, the components relate to CIELab. Psychological studies (K. Toepfer and R. Cookingham, "The Quantitative Aspects of Color Rendering for Memory Colors", in Proceedings of IS&T's PICS Conference 2000, pages 94–98, 2000 showed that this Lab color space is well suited to define memory colors.

Given a particular transformation $T_θ$ (θ denote the parameters of this transformation), we can calculate the a and b values of the reference part i as $$a'_1(θ) = f_a(r'_1(θ), g'_1(θ), b'_i(θ)) = f_a(T_θ(r_i, g_i, b_1)) \quad (3)$$

$$b'_1 = f_b(r'_1, g'_1, b'_i) = f_b(T_θ(r_1, g_i, b_i)) \quad (4)$$

where $f_a$ and $f_b$ denote the functions to calculate the a and b value from the used color space of rgb (e.g. sRGB or Adobe RGB).

Using the set of $a'_i$ and $b'_1$ and the memory color model, i.e. the probability distributions defined in equation (2), we can calculate the total probability, which considers all reference parts as a product of the individual probabilities:

$$p(D \mid θ) = \prod_{i=1}^{N} p(a'_i(θ), b'_i(θ) \mid m_i) \quad (5)$$

The total probability $p(D|θ)$ designates an overall probability that the transformed color values of all reference parts are representing the memory colors respectively assigned to the reference parts. The parameter D designates the input data, i.e. the reference part, the color values of the reference parts and the reference colors assigned to the reference parts. The term $p(D|θ)$ represents the likelihood of the hypothesis θ, i.e. p (D/θ) designates the likelihood of the parameter θ given the input data D. It corresponds to the probability of the input data given a particular value of the parameter θ.

According to one embodiment of the invention, the parameter θ is determined by searching for the maximum of the equation (5), i.e. is determined by a maximum likelihood method which determines $θ_{max}$. In order to achieve an information theoretically optimal parameter θ, preferably the Bayes' equation is used, i.e. the posterior conditional probability may be obtained as follows:

$$p(θ|D) \propto p(D|θ) \cdot p(θ) \quad (6)$$

The posterior probability $p(θ|D)$ describes the probability for the transform parameter θ under the condition of the input data D. Thus $p(θ|D)$ is a measure for the above-mentioned "matching degree". The term $p(θ)$ expresses the knowledge about the probability of the hypothesis θ (i.e. the assumption that the parameters of the transformation have the designated value) before the current data D are observed. The prior knowledge $p(θ)$ of the hypothesis is modified by the likelihood $p(D/θ)$ of the hypothesis. The modification results in the posterior probability $p(θ/D)$ (see equ. 6).The so called prior knowledge $p(θ)$ will be discussed in more detail later. On the basis of the posterior probability, the color correction may be optimized. This may be performed by maximizing the equation (6). If the memory color model and the prior model are multivariate Gaussians, then this probability has convex shape and the maximum can be obtained via a numerical optimization method, e.g. gradient descent in a very efficient way. The method of "gradient descent" represents an optimization technique (numerical technique) for non-linear functions, which attempts to move incrementally to successively lower (in the present case: higher) points in search space, in order to locate a minimum (in the present case a maximum).

The transform parameter $θ_{max}$ for which $p(θ/D)$ is maximal allows to determine the transformation T of equation (1). The determined transformation is $T(θ_{max})$. If θ has for instance only three parameters and the transformation has been defined to be 3×3 and diagonal, the three parameters of $θ_{max}$ represent the diagonal. Preferably the form (e.g. diagonal, 3×3, 5×5, etc.) of the transformation, searched for, is predefined. According to an alternative embodiment, the form of the transformation is chosen in dependence on the input data D, in particular in dependence on the number of selected reference parts. Preferably the transformation is chosen to be the more complex, the more reference parts have been selected. For choosing, preferably a set of predefined transformations is available.

A more detailed explanation on "prior knowledge", "Bayes' rule", "posterior probability" can be found in D. Sivia, Data Analysis—A Bayesian Tutorial, Clarendon Press, Oxford, 1996, which is incorporated herewith by reference.

Preferably a heuristical extension of the above-mentioned model is used. Preferably, the logarithmic function is applied to equation (5) or (6). The application of the logarithm results in a sum of logarithms of probabilities. $\theta_{max}$ is preferably searched for based on this sum. Preferably a weighting factor is introduced in this sum in accordance with the extension of the model, i.e. the individual summands are multiplied by a weighting factor. Preferably the weighting factors are a function of one or more image characteristics of the reference part to which the individual summand relates. A image characteristic may be lightness (luminance), contrast, color hue, color saturation, color contrast, etc., preferably respectively defined for the reference part.

Preferably, the determination of the transformation is performed based on the original data, in particular by applying the above-mentioned methods. This is preferably also the case when the input data are input iteratively, e.g. by means of the slope shown in FIG. 1. Preferably, even if the display device shows the result of the determination of the transformation after each iterative step, the transformation is preferably always calculated based on the original data. That is, the enumerator N is increased by iterative steps or slope cycles but the color values of the reference parts used for the determination of the transform are preferably the original color values of the reference parts and not the corrected color values of the reference parts which have been corrected by a transformation determined in a previous step. Nevertheless, the latter modification, i.e. determining the transformation based on already corrected color values represents an alternative embodiment of the present invention.

Preferably the transformation which results in a correction of the color values is variably applied to the color values, preferably in dependence on at least one image characteristic. Preferably the correction is locally weighted. This weighting may be performed by means of masks which elements relate to local parts of the image, e.g. one pixel or number of adjacent pixels, and the elements represent preferably an image characteristic (e.g. lightness) of the local part. The weighting is preferably performed based on at least one image characteristic. Preferably the image characteristic is luminance (lightness). Alternatively or additionally the image characteristic may be (local) contrast, color hue, color saturation, color contrast, sharpness, etc. The inventor has recognized that in particular a weighting which depends on the luminance allows to avoid color casts in light regions. Preferable the weighting is performed such that the correction is more performed (performed at a higher degree) in areas of medium or mean luminance than in areas of low or high luminance. For instance, in case of no or low luminance, no correction is performed or only a slight correction is performed. If the above-mentioned weighting factor is chosen to be between 0 and 1, the weighting factor is equal or closed to zero in case of low luminance. Preferably the weighting factor increases towards medium luminance. Preferably the weighting factor decreases from medium luminance to high luminance. Preferably the correction factor is about zero or equal to zero in case of maximum or highest possible luminance. The function which may be used for calculating the weighting factor in dependence on luminance may be an inverse parabolic function which has its maximum around the medium luminance.

The above-mentioned prior knowledge $p(\theta)$ on the color correction to be done for particular image data can be of general or of image dependent nature. Examples for "general" prior knowledge could be as follows:

The knowledge about spectral or color characteristics of devices involved in the image capturing process, e.g. spectral or color characteristics of digital cameras and films of a particular type, which are later scanned in order to obtain digital image data. For instance, a certain digital camera may have a characteristic systematic bias in its color sensitivity.

Knowledge about the amount of correction necessary in connection with the devices involved in the image capturing process. For instance, the fact that some digital camera typically needs a larger color correction than others.

Knowledge about pre-processing of the image data, e.g. some color processing algorithms or color correction algorithms applied to the image data before the image data are input in the color correction method of the present invention.

Besides the above-mentioned "general" prior knowledge other kind of knowledge, e.g. the "image dependent" prior knowledge can be used. Examples for "image dependent" prior knowledge are:

Knowledge about characteristics of algorithms involved in the processing of the image data before these image data are subjected to the color correction of the present invention. For instance, the processing may be performed based on an automatic color correction or color constancy algorithm and the precision of these algorithms is known and represents prior knowledge. If, for instance the precision of these algorithms is known, an upper limit for the amount of correction by the color correction method of the present invention may be deduced, based on which $p(\theta)$ may be determined.

The prior knowledge may be based on additional information, which is deduced from the image data. For instance, the image may be classified into a class. The images which are member of a particular class have a particular systematic bias in their color appearance, which may be used to determine $p(\theta)$. For instance, the images may be classified in sunset images, portrait images and so on.

Mathematically speaking, prior knowledge on the color correction is always available as probability distribution $$p(\theta) \tag{7}$$

and can be included in the process of inference via equation (6).

Figure 5:
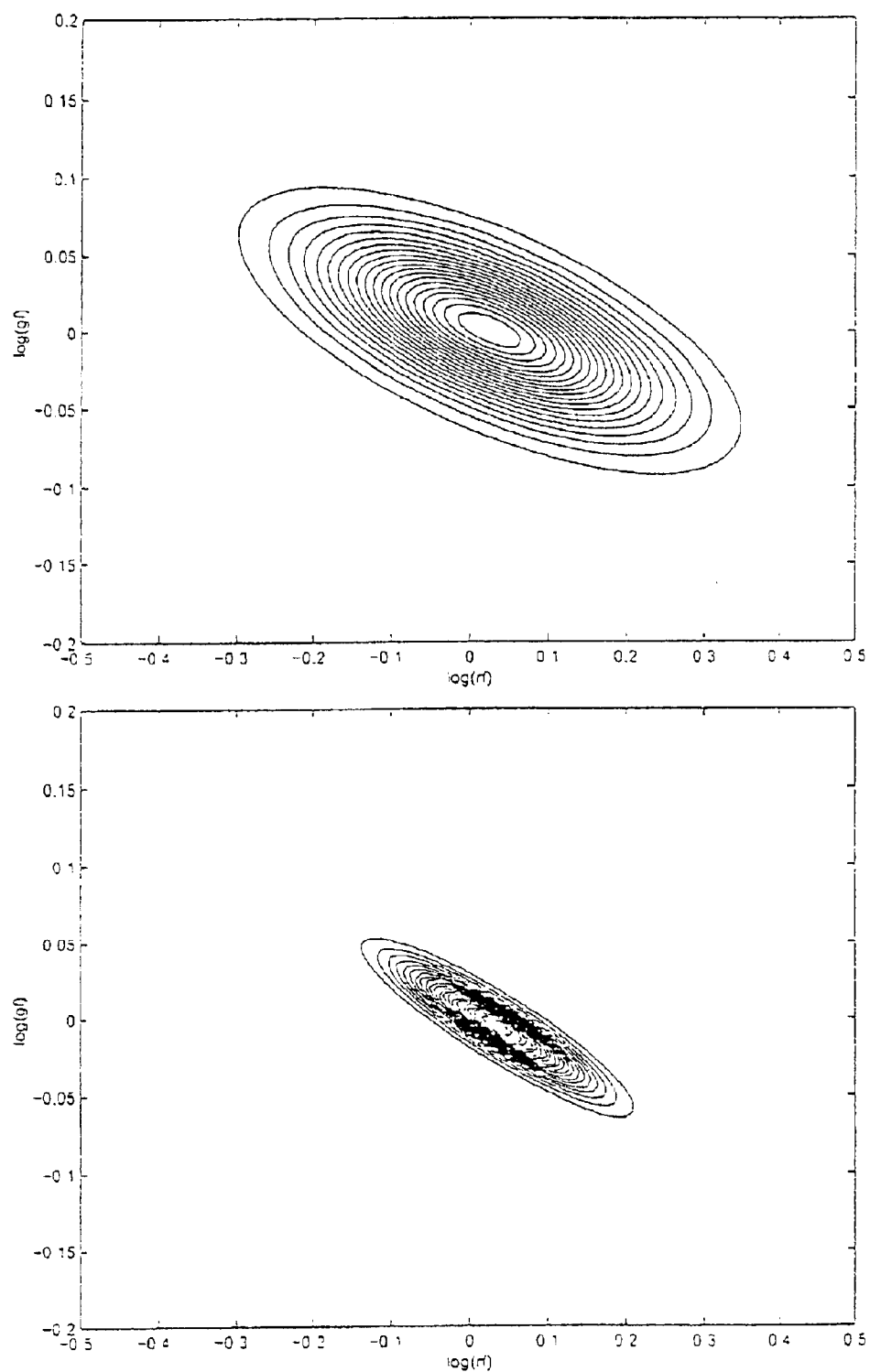
FIG. 5 shows prior knowledge distributions p (log(rf), log(gf)) for digital cameras in general (top) and for a particular model (Kodak DC 210 zoom, bottom)

In the following, an example is given for the determination of $p(\theta)$ in the case prior knowledge is available on the camera model used for image capturing. This figure shows the probability distribution $p(\theta)$ of the color correction required by typical consumer digital cameras in order to obtain pleasing results. The probability distribution has been derived from manual color correction ground truth. The FIG. 5 depicts $p(\log(rf), \log(gf))$ which can be easily converted to $p(\theta)$ with $\theta$ being the vector of scale factors for each color channel $$\theta = \begin{pmatrix} rf \\ gf \\ bf \end{pmatrix} \tag{8}$$

Note that the dimensionality reduces from three to two by keeping the luminance constant. Then it is sufficient to express $p(\theta)$ as a function of rf and gf as depicted in FIG. 5.

The probability distribution $p(\theta)$ represents a model for digital cameras. In comparison to the model of digital cameras in general (FIG. 5, top), the model for one specific camera (Kodak DC210 zoom) is depicted in FIG. 5, bottom. the prior probability p(θ) of the individual camera is much more localized around the point of no correction (rf=gf=bf=0) than the prior probability p(θ) of digital cameras in general, indicating that this particular camera model (in most cases) needs much less correction. It can also be noted that the principle axes of the plotted Gaussians are slightly rotated against each other, indicating the slightly different nature of occurring color casts.

In the following an embodiment of the invention will be presented, which relates to automatic color correction, i.e. a color correction, which does not need an interaction with the user in order to select the reference parts and/or the reference colors. The prior knowledge discussed above represents already some help towards an automatic color correction. However, to achieve a fully automatic processing, it is preferred to automatically detect the regions of the mentioned memory colors, i.e. reference parts in a robust way. For instance, spatial features of the image (two-dimensional distribution of the pixels) may be used for the automatic detection. For instance, structural features, patterns, shapes and textural features of the image may be automatically detected in order to identify reference parts. Furthermore a reference table may be stored which relates, in particular unambiguously reference colors to the spatial features (patterns, structures, textural features, etc.). In this way reference parts may be automatically detected and a reference color may be automatically assigned to the reference parts. For instance, skin regions can be automatically detected using a structural face detector or using other methods and, of course, a skin color will be assigned to the detected skin regions. For instance, regions of foliage can be detected using textural features and, of course, a typical foliage color will be assigned to the detected region.

Examples for pattern recognition may be found in A. Webb, Statistical Pattern Recognition, Arnold, 1999. Pattern recognition in images is described in A. Jain, Fundamentals of Digital Image Processing, Prentic-Hall, International, 1989; J. Richards, X. Jia, Remote Sensing Digital Image Analysis, Springer, 1999, $3^{rd}$ edition.

The color correction method of the present invention is preferably combined with a color management method or the color correction device of the present invention comprising preferably a color management unit. The procedure of optimization of the transformation T described above is, in principle, an optimization using a forward model, i.e. the color transformation T is changed until the modified (transformed) color values optimally match the models of ideal memory colors, i.e. the color values of the color distributions corresponding to the reference colors. In the basic workflow, this match is being done in a standardized color space (e.g. a*b* plane of L*a*b*). However, if it is already known that later the image will be passed to a particular output channel (e.g. a minilab) with a known color management profile (such as an ICC profile, International Color Consortium, http://www.color.org) then this knowledge is preferably used during the optimization process.

The color profile relates the color values of the input data which are input into the output channel to the color values which are output by the output channel (output device). Assuming, for instance, that the image data input in the output channel express the color values as rgb values and that the color values expressed by the output signal of the output channel are represented as Lab values, then the color profile contains the information of which Lab values are to be expected on the output for which input rgb values. The Lab values relate, for example, to those Lab values, which are measured when optically analyzing the printout of a printer, which represents the output channel. The optimization step of MCPCC can be done in such a way to optimize the reproduction of memory colors output by the output channel (e.g. the memory colors on the printout).

The FIG. 6a shows the basic optimization loop. The data rgb are input in the color correction process of the present invention and are to be corrected by a correction transformation T. As a result of the correction transformation T color values r'g'b' are obtained. These color values are subjected to a color space conversion in order to obtain L*a*b* color values. Based on the memory color model (color distributions), which represent the information on the reference colors or ideal a*b* values, it is checked in a step marked by "?" in FIG. 6a whether the a*b* values obtained after the color space conversion match with the ideal a*b* values. The color correction transformation T is changed until the matching is optimized. This may be done, for instance, iteratively as indicated by the optimization loop in FIG. 6a.

The color correction transformation T and the color space conversion may be represented by a transformation T', which comprises both the color correction transformation T and the color space conversion. The optimization loop is then performed in order to optimize the (overall) transformation T'.

The FIG. 6b depicts the optimization via forward modelling. The basic optimization procedure of FIG. 6a is combined with color management for a known output channel. The overall transformation T' comprises instead of the color space conversion transformation a color management transformation. Of course, according to an alternative embodiment, the overall transformation T' may comprise both a color management transformation and a color space transformation. Furthermore the sequence of the correction transformation T and the color management transformation or the color space transformation may be changed, i.e. the color space transformation or the color management transformation may be performed before the color correction transformation.

The color management transformation corresponds to an application of a color profile on the r'g'b' color values in order to achieve output values, which are expected to be output by the output channel (output device). If, for instance, the output device is a printer, the color management transformation results in L*a*b* color values, which are expected on the prints produced by the printer. As in FIG. 6a, the "?" marks the checking of the quality of the matching between the transformed color values and the color values, which result from the memory color model (ideal a*b*).

Additionally or alternatively to the color management transformation a color appearance transformation may be incorporated in the optimization loop shown in FIG. 6a and in FIG. 6b. If this is the case, the overall transformation T' comprises not only the correction transformation T but at least also a color appearance transformation. The color appearance transformation represents a color appearance model. If the color appearance transformation replaces the color management transformation in FIG. 6b, this would mean that neither the theoretical color (basic optimization) nor the paper color (basic optimization plus color management model) but instead the perceived color is optimized using MCPCC.

This can be easily done by substituting the color management engine in FIG. 6b by a color appearance model (see M. Fairchild and N. Moroney as mentioned above). Preferably the color appearance transform, which represents the color appearance model results in a color correction, which adjusts the color values output by the color correction to typical conditions under which a human being perceives the colors. For instance, the color values may be adjusted to a typical illumination type (e.g. A or D65), a typical background color on which the image is looked at for instance, the background color provided by a photographic album. The color values may be adjusted to the kind of medium used for printouts. The kind of medium may have an influence on the color perception, e.g. the medium may be shiny (brilliant) or mat. Additionally the strength of the illumination (brightness) may have an influence on the perception of the colors by human being and the color correction may be adapted, for instance, to typical illumination strength, when a human being looks at the image. Furthermore, the color values may be adjusted to the surround which is defined based on the relationship between relative luminance of the surround and the luminance of the image white. For instance, CIECAM97 defines averages dim, dark and cut sheets.

Regarding color, the most important input parameter of the color appearance model is the white point. Thereby, one has to differentiate between the adopted white point (the computational white point used during calculations) and the adapted white point (the white point of the internal human visual system for a given set of viewing conditions). Color appearance models provide mathematical models to convert from tristimulus values (that can be obtained from Lab values) to perceptual attributes and can thus be directly used in the optimization step depicted in FIG. 6.

Figure 7:
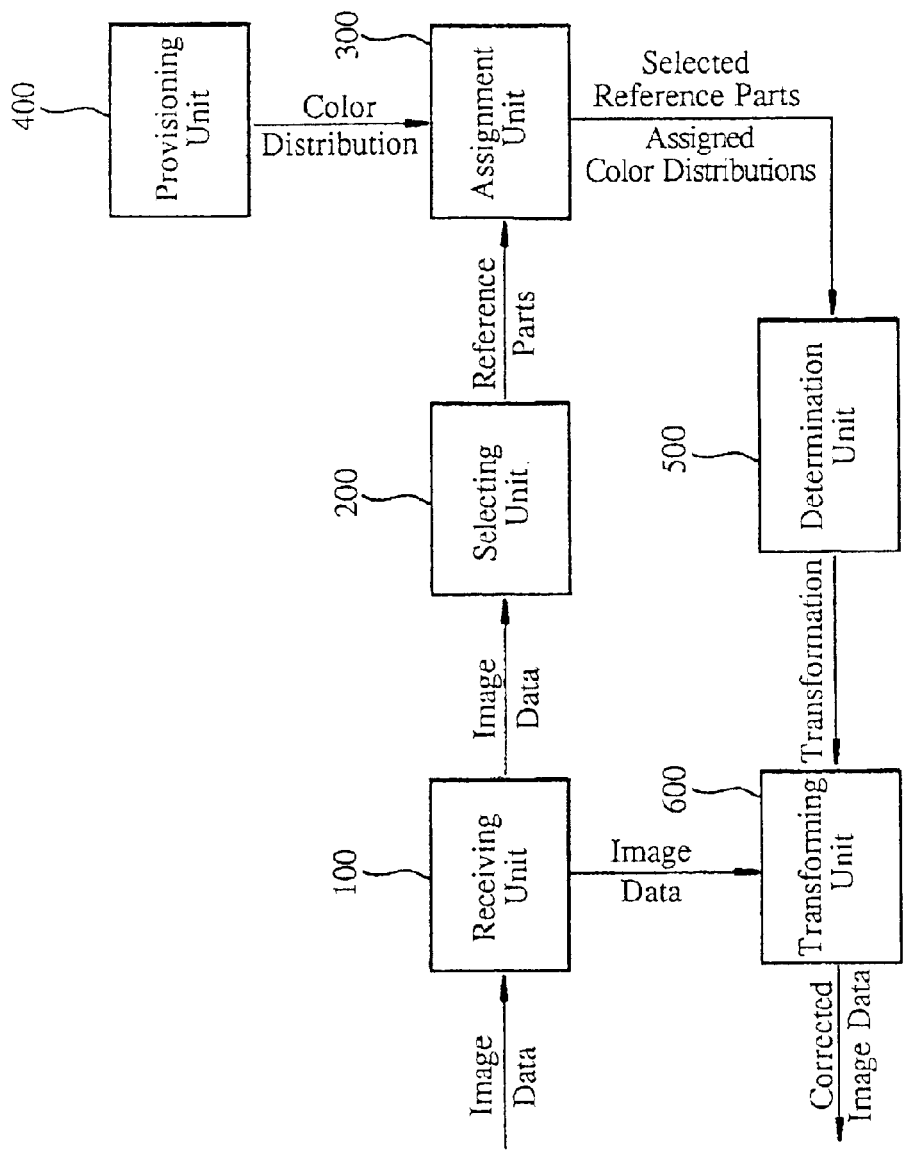
FIG. 7 shows a schematic structure of a photographic image processing device, which may also be called a color correction device in accordance with an embodiment of the present invention.

FIG. 7 shows schematically the structure of a photographic image processing device or color correction device, which performs the correction in accordance with the invention. The receiving unit 100 receives the image data. The unit 100 may be a modem or a network port. The receiving unit passes the image data to the selecting unit 200. The selecting unit may, for instance, comprise a user interface (monitor, keyboard, mouse), which allows the selecting of the reference parts. Alternatively the selecting unit may automatically select the reference parts as mentioned above. The reference parts are passed from the selecting unit to the assignment unit 300. The assignment unit accesses the provisioning unit 400, which may be a memory or storage and which provides the color distributions to the assignment unit upon request. The assignment unit assigns the appropriate color distributions to the reference parts. The reference parts together with the assigned color distributions are passed from the assignment unit 300 to the determination unit 500. The determination unit 500 determines the transformation e.g. by means of the optimization loop described above. The determined transformation is passed to the transforming unit 600. The transforming unit 600 receives the image data from the receiving unit and transforms the image data in accordance with the transformation in order to obtain the corrected image data, which are then output by the photographic image processing device or color correction device of the present invention.

What is claimed is:

1. A color correction method for correcting the colors of photographic images represented by image data, said image data defining color values, comprising the steps of:
   a) providing a set of distributions of color values in a color space,
   b) selecting one or more reference parts of the image to be corrected, each of said one or more reference parts having at least one color value;
   c) assigning one of said set of distributions to each selected reference part of said one or more reference parts;
   d) determining a transformation for transforming the at least one color value of the one or more reference parts such that the transformed at least one color value at least approximately matches the color values of the one or more assigned distributions or matches the color values of those distributions better than the at least one untransformed color value; and
   e) transforming the color values of the image data by means of the determined transformation to achieve a corrected image.

2. The color correction method of claim 1, wherein the steps of b) selecting, c) assigning, d) determining and e) transforming are repeated based on the uncorrected image data which represent the image to be corrected.

3. The color correction method of claim 1, wherein, during said repetition, reference parts selected in one or more previous steps b) and in a current step b) and reference colors assigned in one or more previous steps c) and in a current step c) are used for the determination of the transformation in a current step d).

4. The color correction method of any of claim 1, wherein, in case of a plurality of reference parts, the matching is performed in accordance with an optimisation process which evaluates a total matching degree between the transformed color values and the color values of the assigned distributions for the plurality of reference parts and which determines the transformation such that a function describing the total matching degree is optimized, said function mathematically combining matching degrees for the respective reference parts and the respectively assigned distributions.

5. The color correction method of claim 1, wherein said distributions define a probability of color values to represent a reference color and wherein said matching is optimized based on said probability.

6. The color correction method of claim 1, wherein said distributions express reference color probabilities ($p(a, b|A_k)$) that the at least one color values of the one or more reference parts represents a realisation of a reference color which corresponds to one of said set of distributions and wherein said transformation is performed such that a probability of said matching is optimized.

7. The color correction method of claim 6, wherein the determination of the transformation in step d) is based on both the reference color probability and a distribution which expresses the prior knowledge in accordance with Bayes' rule.

8. The color correction method of claim 7, wherein the determination of the transformation in step d) is made by means of a hypothesis, which represents the transformation, and by calculating a reference color likelihood ($p(D/\theta)$) based on at least one of said reference color probabilities ($p(a, b|A_k)$), said likelihood representing the likelihood of the hypothesis given the at least one color value to be corrected, the one or more selected reference parts, and the one or more assigned distributions.

9. The color correction method of claim 8, wherein the transformation is determined by evaluating the maximum for a posterior probability ($p(\theta/D)$) which expresses the probability of the hypothesis given the at least one color value to be corrected, the one or more selected reference parts, and the one or more assigned distributions, said posterior probability being calculated based on both the reference color likelihood and the prior knowledge which expresses the knowledge about the probability of the hypothesis before the at least one color value to be corrected, the one or more selected reference parts and the one or more assigned distributions were known.

10. The color correction method of claim 1, wherein an algorithm, which analyses the spatial information included in the image data, is used to select reference parts of the image and to assign distributions to those reference parts, wherein the algorithm analyses only luminance information included in the color values of the image data and wherein the color correction corrects only color hue and/or color saturation information included in the color values of the image data.

11. The color correction method of claim 1, wherein the color values of the image data and the color values of the distributions are present in different color spaces and wherein said transformation determined in step d) comprises a color space transformation as a result of which the color values transformed by the transformation and the color values of the distributions are in the same color space.

12. The color correction method of claim 1, wherein the transformation is determined in step d) such that the transformation comprises a color management transformation, said color management transformation modelling the manipulation of the color values of the image data by an output device into which the image data, which result from the color value transformation in step e), are to be input.

13. The color correction method of claim 1, wherein the transformation is determined in step d) such that the transformation comprises a color appearance transformation, said color appearance transformation modelling the perception of the color values of the image data by a human being, who perceives the image data, which result from the color value transformation in step e) and which are output by an output device of predefined color value manipulation references.

14. A photographic image processing device which digitally processes photographic images for correcting the colors of digital photographic images, comprising:

a) a provisioning unit which provides a set of distributions of color values in a color space, b) a receiving unit which receives digital image data representing a photographic image by means of color values;

c) a selecting unit which selects one or more reference parts of the image, each of said one or more reference parts having at least one color value;

d) an assignment unit which assigns one of said set of distributions to each selected reference part of said one or more reference parts;

e) a determination unit which determines a transformation for transforming the at least one color value of the one or more reference parts such that the transformed at least one color value at least approximately matches the color values of the one or more assigned distributions or matches the color values of those distributions better than the at least one untransformed color value; and f) a transforming unit which transforms the color values of the image data by means of the determined transformation to achieve a corrected image.

* * * * *